Feb. 13, 1923.
V. A. LANE
SPRING COMPRESSOR
Filed Apr. 12, 1921
1,444,797
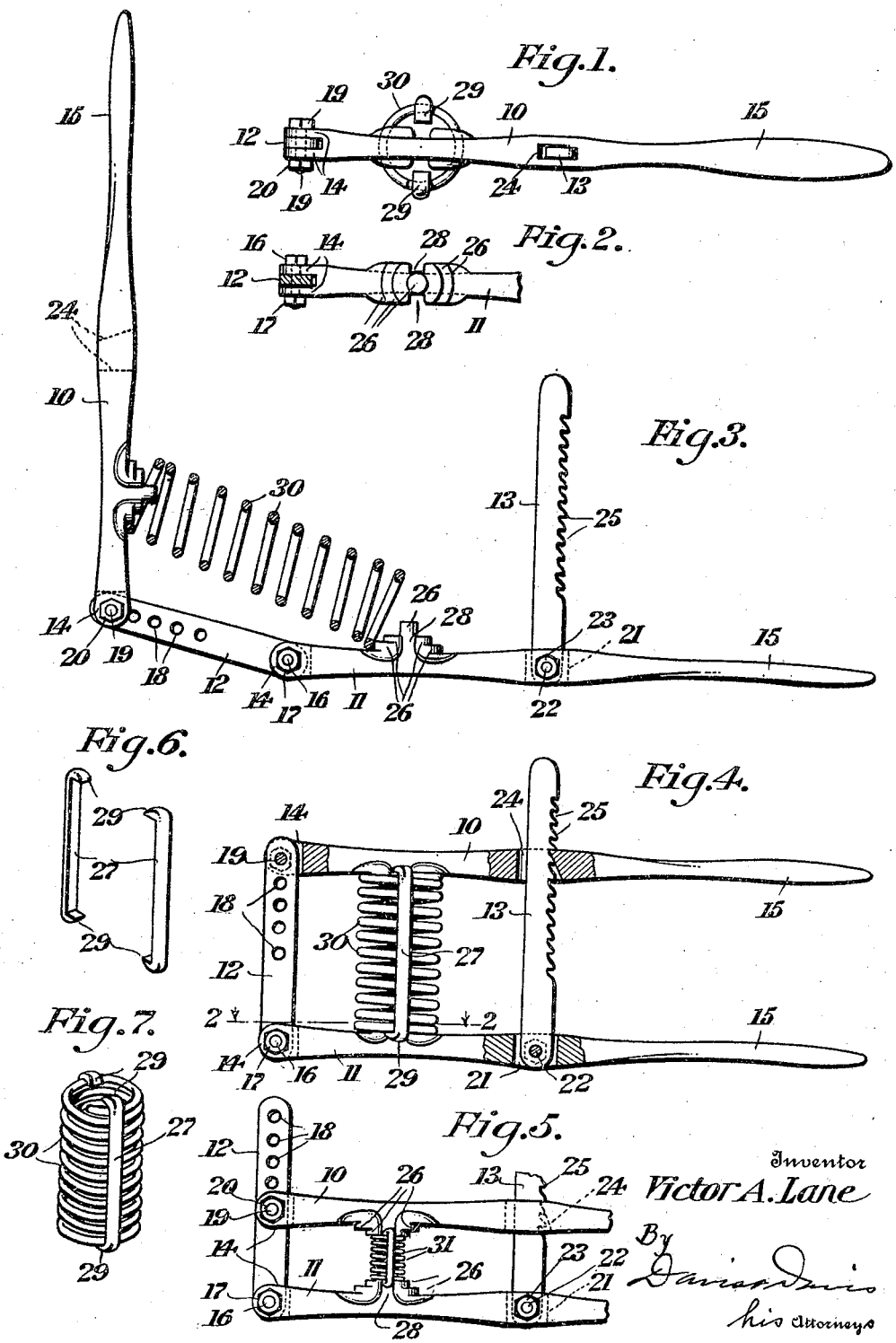

Patented Feb. 13, 1923.

1,444,797

UNITED STATES PATENT OFFICE.

VICTOR A. LANE, OF NEW YORK, N. Y.

SPRING COMPRESSOR.

Application filed April 12, 1921. Serial No. 460,606.

*To all whom it may concern:*

Be it known that I, VICTOR A. LANE, a citizen of the United States, and resident of City Island, in the borough and county of Bronx, city and State of New York, have invented certain new and useful Improvements in Spring Compressors, of which the following is a specification.

This invention relates to improvements in spring compressors, and has for one of its objects to provide a simple and inexpensive implement for compressing coil springs, such as valve and clutch springs, to facilitate the assembly of the springs with the parts associated therewith.

A further object of the invention is to provide an implement for easily and quickly compressing coil springs of various sizes and holding the same compressed while the operator applies locking clips or other tying means to the compressed spring for maintaining the spring under compression after removal thereof from the compressing implement.

In the drawings:

Figure 1 is a plan view of the implement, showing the compressing members locked together;

Fig. 2 a fragmentary sectional view on the line 2—2 of Fig. 4;

Fig. 3 a side elevation of the implement, showing the position of the parts at the beginning of the operation of compressing a long spring having coils of large radius;

Fig. 4 a side elevation, partly in vertical section, showing a large spring under compression and also showing the retaining clips applied to the compressed spring;

Fig. 5 a view similar to Fig. 4, showing a short spring having coils of small radius under compression;

Fig. 6 a perspective view showing the two clips for locking the springs under compression; and Fig. 7 a perspective view of a compressed spring with the retaining clips applied thereto.

The implement comprises two relatively shiftable compression members 10 and 11, a link 12 connecting said members together at one end, and a latch 13 for locking the members 10 and 11 together after a spring has been compressed to the desired extent. Members 10 and 11 are preferably formed of metal castings and are of the same general conformation, having forked or bifurcated portions 14 at one end and handle portions 15 at the other end thereof. One end of link 12 is pivotally held in the forked end 14 of member 11 by means of a pivot bolt 16 having a nut 17 threaded thereon. Link 12 is provided with a series of apertures 18 to permit the forked end 14 of member 10 to be pivotally connected with the link different distances from the pivot 16. A bolt 19 adapted to be passed through apertures in the forked end 14 of member 10 and through either of the apertures 18 in link 12, and having a nut 20 threaded thereon, serves to pivotally connect member 10 and link 12.

One end of lach 13 engages in a longitudinal slot 21 in member 11 and is pivotally held to said member by a bolt 22 having a nut 23 threaded thereon. Slot 21 is longer than the width of latch 13, as more clearly shown in Fig. 4, to permit a limited swinging movement of the latch about the pivot bolt 22. The free end of the latch is adapted to pass through a longitudinal slot 24 in member 10, said slot being slightly longer than the width of the latch and having one end wall thereof inclined to form a knife edge at the outer side of the member 10 which is adapted to engage under either one of a series of teeth 25 formed on one edge of the latch.

Members 10 and 11 are provided at points adjacent the forked ends 14 thereof, and equidistant from said forked ends, with similarly formed spring positioning and retaining means. I prefer to employ the positioning and retaining means shown in the drawings which comprises a projection formed on the inner face of each member and having a plurality of substantially cylindrical portions 26 of different diameters adapted to engage within the end coils of springs of different sizes. To facilitate the placing of the locking clips 27 upon a spring compressed in the implement, I prefer to cut-away or flatten opposite sides of the larger portions 26 of the spring retaining projections and to provide vertical slots 28 therein. Slots 28 permit engagement of the laterally bent ends or hook portions 29 of clips 27 around the end coils of springs of small diameter.

In Figs. 3 and 4 I have illustrated the initial and final positions of the parts in the operation of compressing a long spring 30 having coils of large diameter, while in Fig. 5 I have shown the final position of the parts, with the implement adjusted for compressing a short spring 31 having coils of small diameter. It will be observed that during the compressing operation member 10 swings about pivot 16 as well as about pivot 19. This arrangement permits a maximum compression of a spring without swinging the handle ends 15 closer together than the distance between the opposite ends of members 10 and 11, so that there is no tendency to buckle the spring as the compressing thereof is completed. This arrangement also permits use of the tool to compress much longer springs than would be possible if member 10 swung about a single pivotal axis in fixed relation to member 11. By providing latch 13 for locking members 10 and 11 together at the conclusion of the compressing operation, the operator's hands are left free to apply the retaining clips 27 which hold the spring in its compressed condition after removal from the implement.

What I claim is:

1. A device of the class set forth comprising a pair of compression members provided intermediate their ends with means for holding the ends of a coiled spring against displacement, a link, and means for pivotally connecting both of said members at one end thereof with the link at points various distances apart.

2. A device of the class set forth comprising a pair of compression members, means on each member intermediate the ends thereof for engaging within the end of a coiled spring, a link pivotally connected at one end to one end of one compression member, and means for pivotally connecting one end of the other compression member to said link at either one of a plurality of points spaced apart longitudinally of the link.

3. A device of the class set forth comprising a pair of compression members, spring-engaging means on said members, a link, means for pivotally connecting both of said members to said link at spaced points, and a latch mounted on one of said members for locking the other member against movement away from the latch-carrying member.

4. A device of the class set forth, comprising a pair of compression members provided with stepped projections on adjacent faces thereof, a link, and means for pivotally connecting said members with the link.

5. A device of the class set forth comprising a pair of compression members having projections on adjacent faces thereof, a link, means for pivotally connecting said members with the link at points varying distances apart, and a latch carried by one member adapted to engage the other member to hold the members against movement away from each other.

In testimony whereof I hereunto affix my signature.

VICTOR A. LANE.